(12) United States Patent
Tanaka

(10) Patent No.: US 10,124,436 B2
(45) Date of Patent: Nov. 13, 2018

(54) WELDED STRUCTURAL MEMBER PRODUCTION METHOD AND WELDED STRUCTURAL MEMBER

(71) Applicant: MAZDA MOTOR CORPORATION, Hiroshima (JP)

(72) Inventor: Masaaki Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 252 days.

(21) Appl. No.: 14/979,807

(22) Filed: Dec. 28, 2015

(65) Prior Publication Data

US 2016/0184916 A1    Jun. 30, 2016

(30) Foreign Application Priority Data

Dec. 26, 2014 (JP) ................................ 2014-265677
Dec. 26, 2014 (JP) ................................ 2014-265683

(51) Int. Cl.
*B23K 9/173* (2006.01)
*B23K 9/025* (2006.01)
(Continued)

(52) U.S. Cl.
CPC ............ *B23K 9/173* (2013.01); *B23K 9/0253* (2013.01); *B23K 33/006* (2013.01);
(Continued)

(58) Field of Classification Search
CPC .......... B23K 2201/006; B23K 2201/04; B23K 31/00; B23K 33/006; B23K 33/008; B23K 5/10; B23K 9/0253; B23K 9/173
See application file for complete search history.

(56) References Cited

U.S. PATENT DOCUMENTS 2,728,587 A * 12/1955 McKinley ............... B62D 21/02
                                                                    280/797
3,634,650 A *  1/1972 Nomura ............... B23K 9/0017
                                                                   219/137 R
(Continued)

FOREIGN PATENT DOCUMENTS

JP    H07-246464 A    9/1995
JP    H11-277265 A   10/1999
(Continued)

OTHER PUBLICATIONS

CN Office Action dated Sep. 4, 2017, from corresponding CN Appl No. 20151098284.6, with English summary, 7 pp.
(Continued)

*Primary Examiner* — Jacob Cigna
(74) *Attorney, Agent, or Firm* — Studebaker & Brackett PC

(57) ABSTRACT

Disclosed is a welded structural member production method comprises: a first preparation step of preparing a cross-sectionally hat-shaped first metal workpiece which has a first base wall, a pair of first standing walls and a pair of flanges; a second preparation step of preparing a cross-sectionally U-shaped second metal workpiece which has a second base wall, and a pair of second standing walls; a positioning step of positioning the first metal workpiece and the metal workpiece in such a manner that each of two pairs of distal edges of the second standing walls and inner edge regions of the flanges are butted against each other; and a joining step of externally welding a butted region of each of the pairs of the distal edges of the second standing walls and the inner edge regions of the flanges to thereby join the first and second metal workpieces together.

13 Claims, 12 Drawing Sheets

(51) Int. Cl.
*B23K 33/00* (2006.01)
*B23K 101/00* (2006.01)
*B23K 101/04* (2006.01)

(52) U.S. Cl.
CPC ...... *B23K 33/008* (2013.01); *B23K 2201/006* (2013.01); *B23K 2201/04* (2013.01)

(56) References Cited

U.S. PATENT DOCUMENTS

| | | | | |
|---|---|---|---|---|
| 5,180,099 | A * | 1/1993 | Okabayashi | B23K 1/19 228/203 |
| 6,450,253 | B1 * | 9/2002 | Chikuma | F28F 9/002 165/173 |
| 2005/0257591 | A1 * | 11/2005 | Hauger | B21C 37/185 72/368 |
| 2009/0305075 | A1 * | 12/2009 | Flehmig | B21D 19/08 428/603 |
| 2010/0244497 | A1 * | 9/2010 | Honda | B62D 21/02 296/205 |
| 2013/0337285 | A1 * | 12/2013 | Gruber | B62D 21/11 428/595 |
| 2015/0260078 | A1 * | 9/2015 | Kubota | F01N 13/1838 138/163 |

FOREIGN PATENT DOCUMENTS

| | | |
|---|---|---|
| JP | 2003-136243 A | 5/2003 |
| JP | 2005-8117 A | 1/2005 |
| JP | 2012-025335 A | 2/2012 |
| JP | 2012-206156 A | 10/2012 |
| JP | 2013-233579 A | 11/2013 |

OTHER PUBLICATIONS

An Office Action issued by the Japanese Patent Office dated Feb. 7, 2017 which corresponds to Japanese Patent Application No. 2014-265677 and is related to U.S. Appl. No. 14/979,807; with English language translation.

* cited by examiner

WELDED STRUCTURAL MEMBER PRODUCTION METHOD AND WELDED STRUCTURAL MEMBER

TECHNICAL FIELD

The present invention relates to a method of producing a welded structural member having a closed cross-section, and a welded structural member.

BACKGROUND ART

In an automotive vehicle, a member to be assembled to a vehicle body, such as a side member of a subframe for supporting a suspension arm, and a member constituting the vehicle body, such as a front side frame or a rear side frame, are required to be increased in strength from a viewpoint of ensuring strength of the vehicle body to provide enhanced safety, and reduced in weight from a viewpoint of enhancing a fuel efficiency of an engine. For this reason, these members are commonly composed of a closed cross-section structural member made of a metal material.

Heretofore, such a closed cross-section structural member has been produced by: preparing two cross-sectionally hat-shaped metal workpieces each having a base wall, a pair of standing walls each standing from a respective one of widthwise opposite edges of the base wall and a pair of flanges each bending outwardly from a respective one of distal edges of the standing walls; and welding each of two pairs of opposed flanges of the metal workpieces together. More specifically, as illustrated in FIG. 9A, after preparing two metal workpieces 101, 102 whose flanges 111, 112 have different widths, the flanges 111, 112 are superposed on (mated to) each other, and, in this state, a lap fillet welding operation based on arc welding or the like is performed along a lateral edge face of the flange 112 having a smaller width.

In the above welded structural member obtained by welding two metal workpieces, the lower metal workpiece 101 serves as a member for positioning the upper metal workpiece 102, so that it is possible to facilitate position alignment in a direction perpendicular to mated surfaces of the flanges 111, 112. On the other hand, it is necessary to provide the flange 111 (112) along a distal edge of a standing wall of each of the metal workpieces 101, 102, causing a problem that an amount of metal workpiece to be used is increased, resulting in increased weight of the welded structural member, and deteriorated fuel efficiency of an automotive vehicle.

In order to cope with this problem, for example, in a welded structural member illustrated in FIG. 9B, after preparing two cross-sectionally U-shaped metal workpieces devoid of the above flanges, one 202 of the workpieces is fitted in the other workpiece 201, and, in this state, a lap fillet welding operation is performed along an edge face of each standing wall of the outer metal workpiece 201. In this method, no flange is provided in the metal workpieces, so that it is possible to reduce an amount of metal workpiece to be used, and thus facilitate weight reduction, as compared to the welded structural member illustrated in FIG. 9A.

Meanwhile, in the above welded structural member, with a view to weight reduction, the metal workpiece can be prepared using a metal workpiece having a small plate thickness. In this case, as the plate thickness becomes smaller, welding operability is more likely to deteriorate, and a hole is more likely to be formed due to the occurrence of rust. In order to cope with this problem, there are some cases where a plated steel plate is used as a metal workpiece for the metal workpieces. However, the use of a plated steel plate leads to a situation where, when a lap fillet welding operation based on arc welding, laser welding or the like is performed to produce a flange mating-type welded structural member as illustrated in FIG. 9A or a fitting-type welded structural member as illustrated in FIG. 9B, a plated metal is vaporized along with the welding operation to generate metal gas. Then, the generated metal gas is likely to mix in a fusion zone around mated surfaces or fitted surfaces of the flanges, and the fusion zone is solidified while the mixed metal gas is not discharged to the outside, resulting in the occurrence of so-called "blowholes". The blowholes cause insufficiency of strength of the welded structural member. Thus, there is a need to suppress the occurrence of blowholes.

As measures against this problem, JP 2003-136243A describes a production method for the fitting-type welded structural member, wherein a plurality of concave grooves are formed in each standing wall of one of two cross-sectionally U-shaped metal workpieces intermittently along a welding direction. This method can allegedly suppress the occurrence of blowholes by void spaces based on the concave grooves.

However, the method described in JP 2003-136243A involves a problem that the presence of the concave grooves in the metal workpiece imposes restrictions on welding position, and a problem that the occurrence of blowholes still cannot be suppressed in regions where the two metal workpieces are closely fitted with respect to each other.

SUMMARY OF INVENTION

The present invention addresses a technical problem of suppressing the occurrence of blowholes in a welded structural member having a closed cross-section to sufficiently ensure strength of the welded structural member.

The present invention directed to solving the technical problem relates to a method of producing a welded structural member internally having a closed cross-section. This method comprises: a first preparation step of preparing a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls; a second preparation step of preparing a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges; a positioning step of positioning the first metal workpiece and the metal workpiece in such a manner that each of two pairs of the distal edges of the second standing walls and the inner edge regions of the flanges are butted against each other; and a joining step of externally welding a butted region of each of the pairs of the distal edges of the second standing walls and the inner edge regions of the flanges to thereby join the first metal workpiece and the second metal workpiece together to form the closed cross-section.

The present invention also discloses a welded structural member internally having a closed cross-section. This welded structural member comprises: a first portion and a second portion opposed to each other while interposing the closed cross-section therebetween; and a welded portion joining the first portion and the second portion together. The first portion is, in a pre-welding state, composed of a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls, and the second portion is, in a pre-welding state, composed of a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges. Further, the welded portion is formed by externally welding a butted region in which each of two pairs of the distal edges of the second standing walls and the inner edge regions of the flanges are butted against each other.

BRIEF DESCRIPTION OF DRAWINGS

FIGS. 1A and 1B are perspective views of a welded structural member according to one embodiment of the present invention, wherein FIG. 1A illustrates a configuration obtained in the case where welding intensity is relatively low, and FIG. 1B illustrates a configuration obtained in the case where the welding intensity is relatively high.

FIGS. 2A and 2B are front views of the welded structural member according to this embodiment, wherein FIG. 2A illustrates the configuration obtained in the case where the welding intensity is relatively low, and FIG. 2B illustrates the configuration obtained in the case where the welding intensity is relatively high.

DESCRIPTION OF EMBODIMENTS

With reference to the accompanying drawings, the present invention will now be described in details based on one embodiment thereof. In the following embodiment, terms each representing a specific direction, such as "upper (up-ward)" and "lower (downward)", are used. However, it should be noted that these terms are used only for facilitating understanding of the invention in connection with the figures, but are not intended to exclude implementation of the invention in other direction.

Figure 1A:
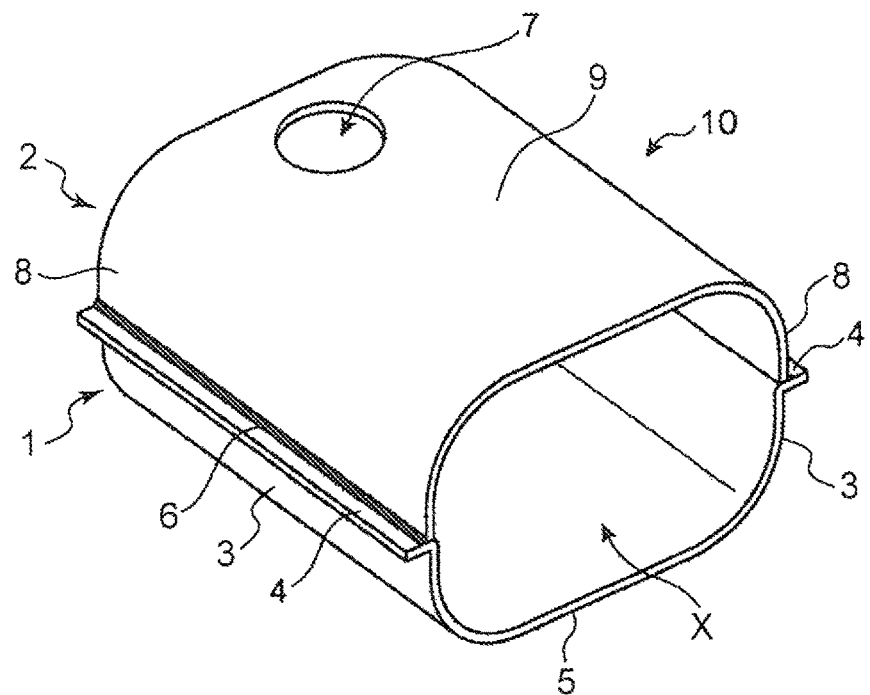
Figure 1B:
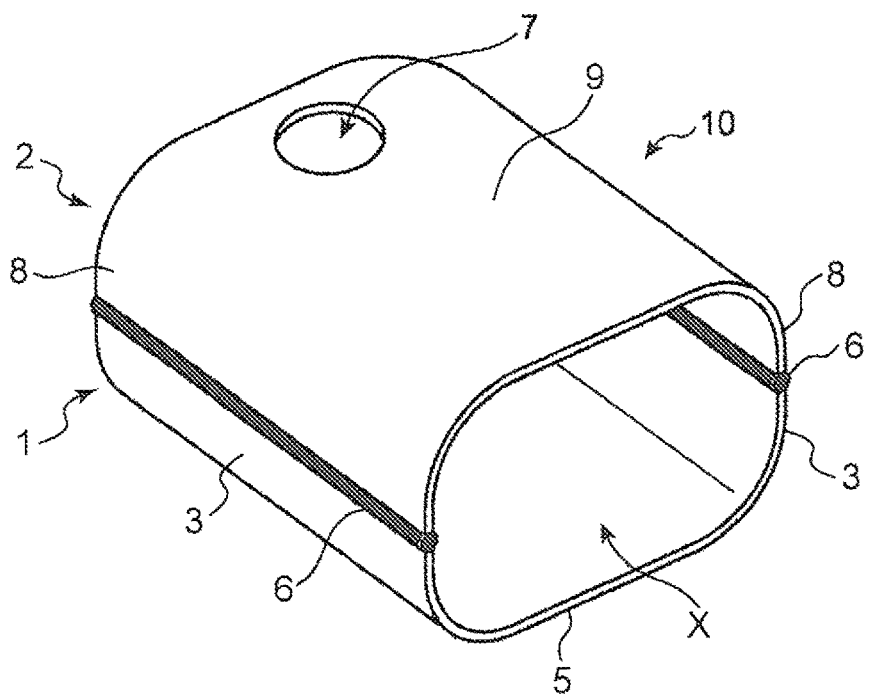
Figure 2A:
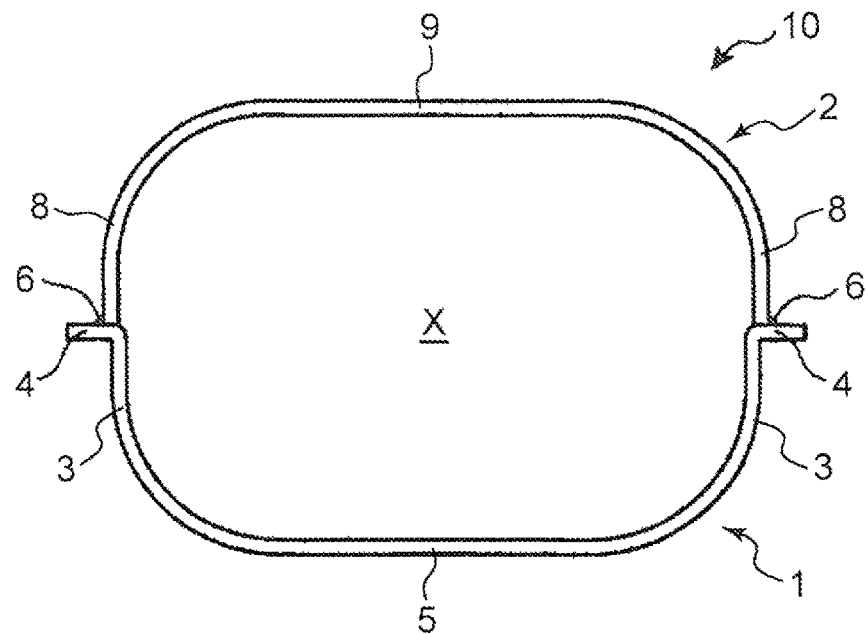
Figure 2B:
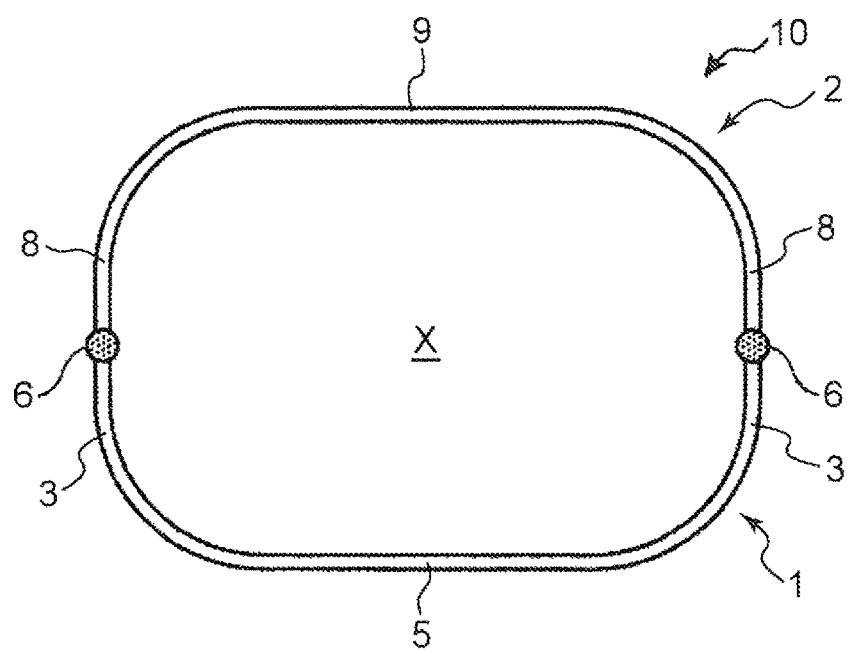

FIGS. 1A and 1B are perspective views of a welded structural member according to one embodiment of the present invention, and FIGS. 2A and 2B are front views of the welded structural member. The welded structural member 10 comprises a first portion 1 and a second portion 2 joined together.

The first portion 1 is formed in a cross-sectionally hat shape or cross-sectionally U shape whose upper surface is opened. More specifically, the first portion 1 has a lower wall 5, and a pair of sidewalls 3 each standing upwardly from a respective one of opposite right and left edges of the lower wall 5. In the case illustrated in FIGS. 1A and 2A where the first portion 1 is formed in a cross-sectionally hat shape, the first portion 1 further has a pair of protruding sections 4 each protruding laterally outwardly from a respective one of upper edges of the sidewalls 3.

The second portion 2 is formed in a cross-sectionally U shape whose lower surface is opened. More specifically, the second portion 2 has an upper wall 9 disposed in opposed relation to the lower surface 5 of the first portion 1 with a distance therebetween in an up-down direction, and a pair of sidewalls 8 each extending downwardly from a respective one of opposite right and left edges of the upper wall 9, toward a corresponding one of the upper edges of the sidewalls 3 of the first portion 1.

A welded portion 6 is formed between each of two pairs of the pair of sidewalls 3 of the first portion 1 and the pair of sidewalls 8 of the second portion 2 (in a butted region). More specifically, the first portion 1 and the second portion 2 are integrally joined through the pair of right and left welded portions 6 to form an approximately rectangular-shaped (more specifically, a rectangular-like shape whose corners are rounded) cross-section X, between the two portions 1, 2.

FIGS. 1A and 2A illustrate a configuration of the welded structural member 10 obtained in the case where welding intensity is relatively low. In this configuration, the protruding section 4 protruding outwardly from each of the upper edges of the sidewalls 3 of the first portion 1 is left on each of opposite lateral surfaces of the welded structural member 10. That is, the welded portion 6 joins together inner edge regions of the right and left protruding sections 4 of the first portion 1 and lower edges of the right and left sidewalls 8 of the second portion 2. In the joined region, the protruding sections 4 of the first portion 1 and the sidewalls 8 of the second portion 2 intersect each other to form an L shape in front view.

FIGS. 1B and 2B illustrate a configuration of the welded structural member 10 obtained in the case where the welding intensity is relatively high. In this configuration, the above protruding section 4 is not left on each of the opposite lateral surfaces of the welded structural member 10. That is, a section equivalent to the protruding section 4 is almost fused to and integrated with the welded portion 6 during welding. Further, in the case where the welding intensity is relatively high, the welded portion 6 can be expanded into the closed cross-section X, as illustrated in FIG. 2B.

As used herein, the term "welding intensity is relatively high" means that a supply amount of welding energy is relatively large, e.g., in a situation where a welding time is relatively long, and the term "welding intensity is relatively low" means that a supply amount of welding energy is relatively small.

As illustrated in FIGS. 1A and 1B, each of the first portion 1 and the second portion 2 is formed with a through-hole 7 for allowing an aftermentioned positioning pin 32 to be penetratingly inserted thereinto.

With reference to FIG. 3 to FIG. 6, a production method for the welded structural member 10 will be described below.

Figure 3:
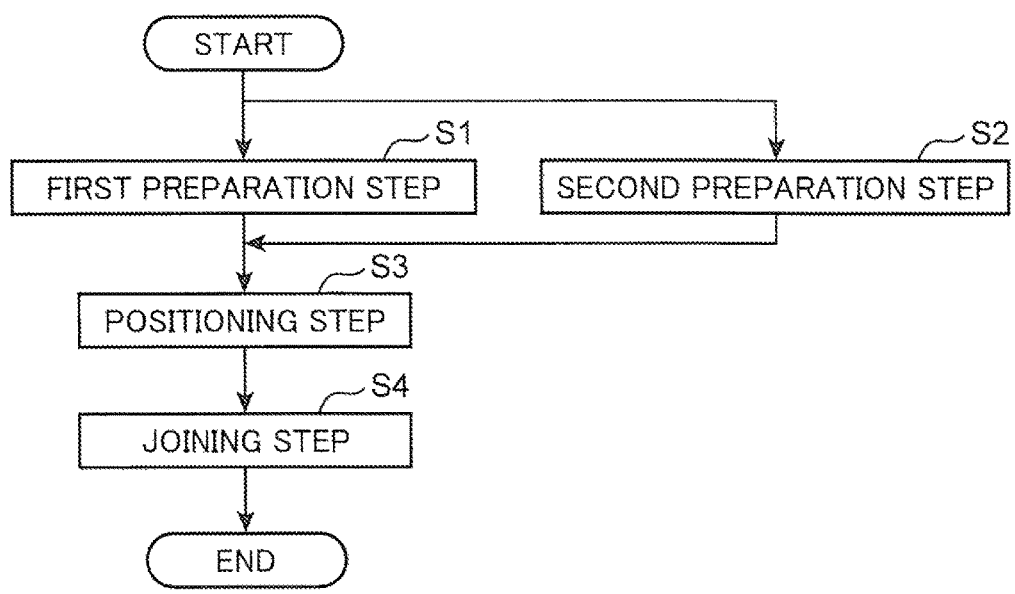
FIG. 3 is an explanatory flowchart of a process of producing the welded structural member according to this embodiment.

The welded structural member 10 is formed by welding together a cross-sectionally hat-shaped first metal workpiece 11 and a cross-sectionally U-shaped second metal workpiece 21 each prepared through press forming. The metal workpieces 11, 21 is a zinc-plated steel plate. With a view to ensuring a required strength, high-tensile steel plate may be used as the metal workpieces 11, 21. As illustrated in FIG. 3, the production method for the welded structural member 10 comprises the following steps S1 to S4.

(S1): A first preparation step of preparing the cross-sectionally hat-shaped first metal workpiece 11.
(S2): A second preparation step of preparing the cross-sectionally U-shaped second metal workpiece 21.
(S3): A positioning step of positioning the metal workpieces 11, 21.
(S4): A joining step of joining the first metal workpiece 11 and the second metal workpiece 21 together.

Figure 4A:
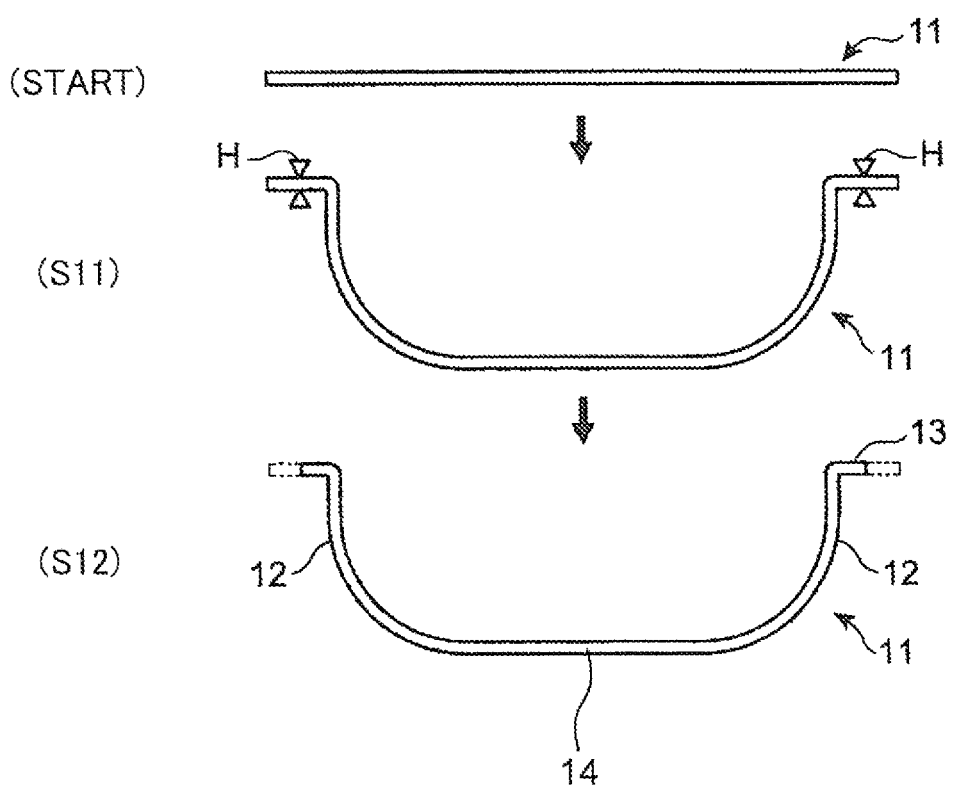
FIG. 4A is a schematic diagram illustrating a step of forming a first metal workpiece by pressing.

As schematically illustrated in FIG. 4A, in the first preparation step S1, the following substeps S11 and S12 are performed. In FIG. 4A, illustration of a press die assembly such as a punch and a die is omitted.

(S11): A substep of pressing a flat plate-like metal workpiece 11 by a drawing process into a cross-sectionally hat-shape.
(S12) A substep of trimming a region of a flange of the formed hat-shaped plate located outward of a holding position H.

Figure 5:
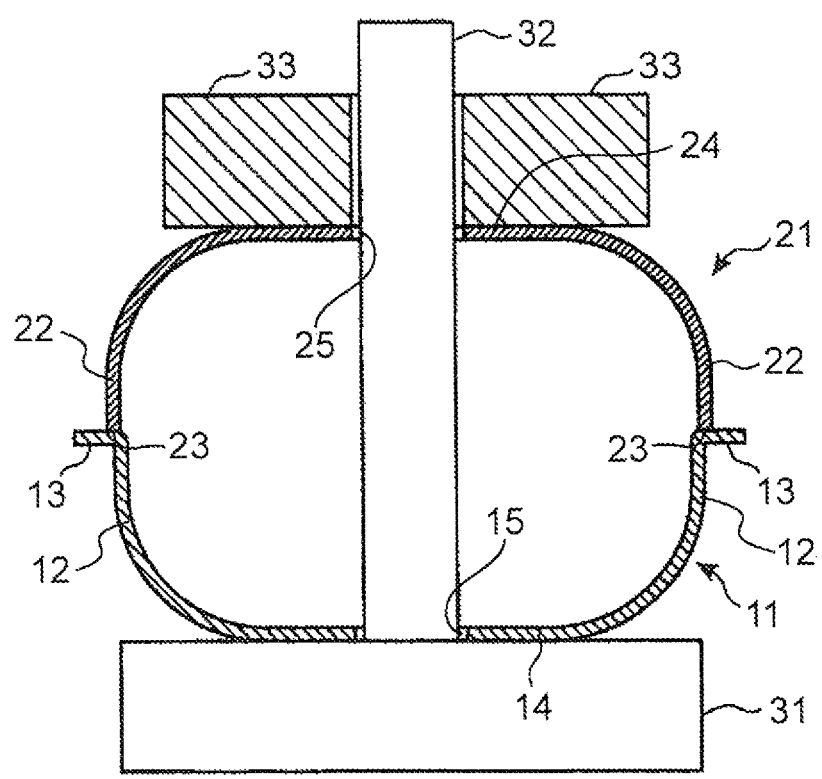
FIG. 5 is a schematic diagram illustrating a step of positioning the first and second metal workpieces.

The cross-sectionally hat-shaped first metal workpiece 11 formed by the first preparation step S1 (S11+S12) has a base wall 14 (first base wall), a pair of standing walls 12 (first standing walls) each standing from a respective one of widthwisely opposite edges (opposite right and left edges) of the base wall 14, and a pair of flanges 13 each bending outwardly from a respective one of distal edges of the standing walls 12. The base wall 14 is formed with a through-hole 15 (FIG. 5).

The first metal workpiece 11 is a component to be subsequently formed as the first portion 1 of the welded structural member 10. That is, the base wall 14, the standing walls 12, the flanges 13 and the through-hole 15 in the first metal workpiece 11 correspond, respectively, to the lower wall 5, the sidewalls 3, the protruding sections 4 and the through-hole 7 in the first portion 1.

Figure 4B:
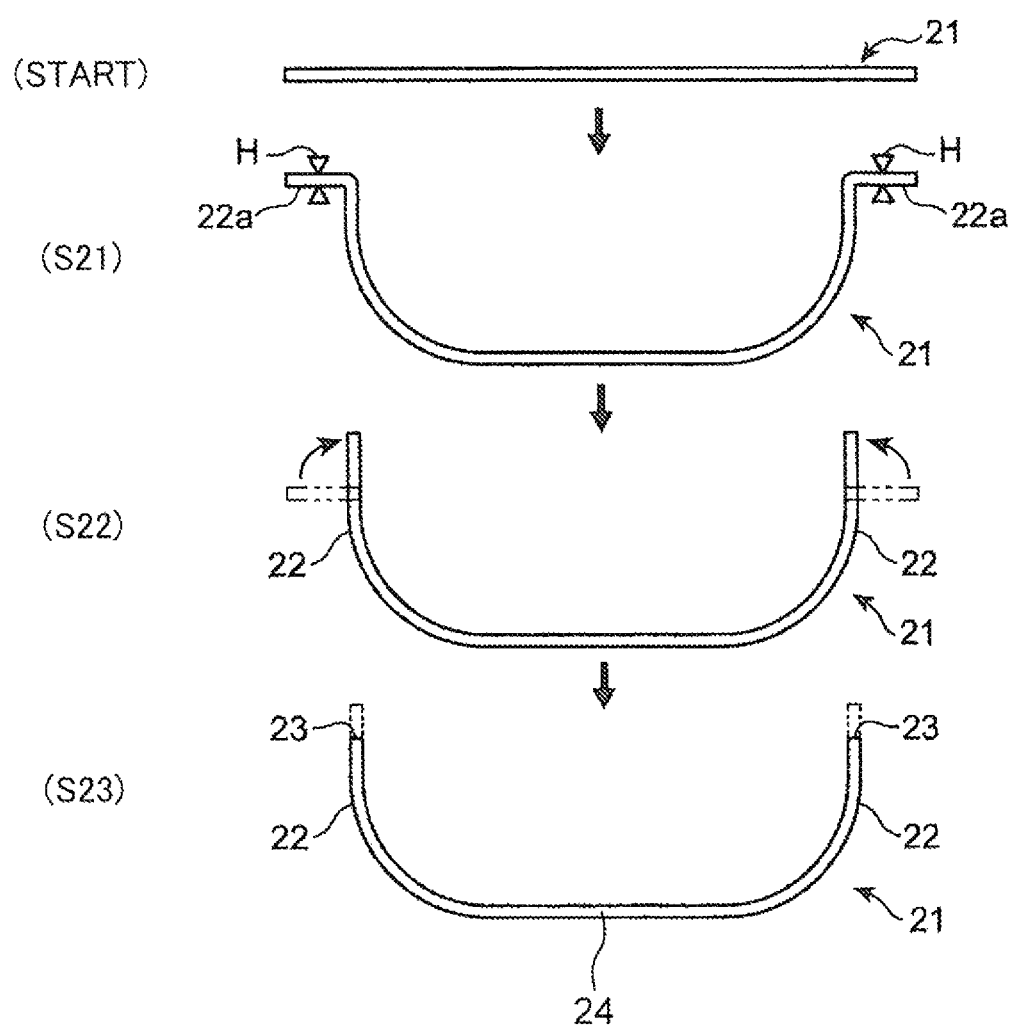
FIG. 4B is a schematic diagram illustrating a step of forming a second metal workpiece by pressing.

As schematically illustrated in FIG. 4B, in the second preparation step S2, the following substeps S21 to S23 are performed. In FIG. 4A, illustration of a press die assembly such as a punch and a die is omitted.

(S21): A substep of pressing a flat plate-like metal workpiece 21 by a drawing process into a cross-sectionally hat-shape.
(S22): A substep of bending back a flange 22a of the formed hat-shaped plate to form a cross-sectionally U-shaped plate.
(S23): A substep of trimming a distal edge region 23 of each standing wall 22 of the formed U-shaped plate to allow the standing wall 22 to have a desired height dimension.

It should be understood that, in the above substeps S22 and S23, after trimming a region of the flange of the hat-shaped plate located outward of the holding position H, as described in connection with the substep S12, the flange 22a may be bent back.

The cross-sectionally U-shaped second metal workpiece 21 formed by the second preparation step S2 (S21+S22+S23) has a base wall 24 (second base wall), and a pair of standing walls 22 (second standing walls) each standing from a respective one of widthwisely opposite edges (opposite right and left edges) of the base wall 24. The base wall 24 is formed with a through-hole 25 (FIG. 5). The standing walls 22 are formed at positions where distal edges 23 thereof can be butted against respective inner edge regions of the flanges 13 of the first metal workpiece 11. As illustrated in detail in FIG. 6, because of the nature of the press forming, each of the flanges 13 of the first metal workpiece 11 is formed to smoothly bend from a respective one of the standing wall 12, so that a roundness having a given radius is formed in a corner region between the flange 13 and the standing wall 12. Thus, to be exact, the distal edge 23 of the standing wall 22 is butted against a flat region of the flange 13 located at a position slightly outward of an innermost edge of the flange 13.

The second metal workpiece 21 is a component to be subsequently formed as the second portion 2 of the welded structural member 10. That is, the base wall 24, the standing walls 22 and the through-hole 25 in the second metal workpiece 21 correspond, respectively, to the upper wall 9, the sidewalls 8 and the through-hole 7 in the second portion 2.

As is obvious from comparison the preparation processes for the first and second metal workpieces 11, 21 (FIGS. 4A and 4B), a cross-sectionally hat-shaped metal workpiece such as the first metal workpiece 11 can be prepared by a smaller number of steps than a cross-sectionally U-shaped metal workpiece such as the second metal workpiece 21. Therefore, the welded structural member 10 according to this embodiment can be produced in a simpler manner and at a lower cost, as compared to the conventional fitting-type welded structural member.

FIG. 5 is a schematic diagram illustrating the step of positioning the first and second metal workpieces 11, 21. In the positioning step S3, each of two pairs of the distal edges 23 of the second standing walls 22 of the second metal workpiece 21 and the inner edge regions of the flanges 13 of the first metal workpiece 11 are butted against each other. More specifically, the first metal workpiece 11 and the second metal workpiece 21 are placed on a supporting base 31 while the first metal workpiece 11 is located at a lowermost position. A positioning pin 32 is standingly attached onto the supporting base 31, and penetratingly inserted into the through-holes 15, 25 formed in the metal workpieces 11, 21. Thus, the first metal workpiece 11 and the second metal workpiece 21 are positioned in a horizontal direction. The first metal workpiece 11 also is positioned between the supporting base 31 and the second metal workpiece 21, in an up-down direction. Further, the second metal workpiece 21 is pressed from thereabove by a clamp 33. Thus, the second metal workpiece 21 is positioned between the first metal workpiece 11 and the clamp 33, in the up-down direction.

Figure 10:
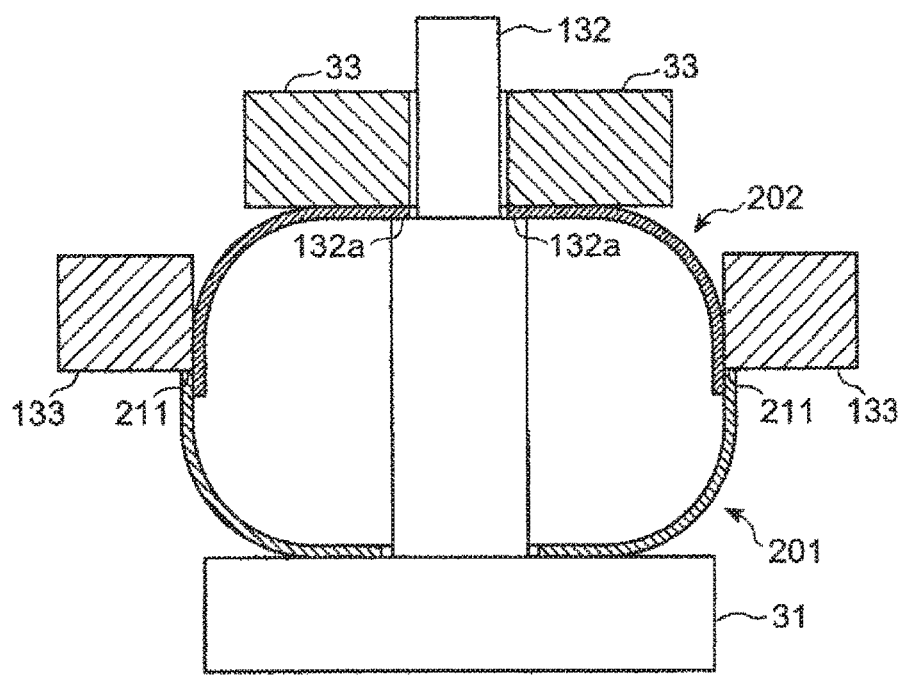
FIG. 10 is a schematic diagram illustrating a step of positioning two metal workpieces, in a production method for a conventional welded structural member (fitting-type welded structural member).

For comparison, a step of positioning two metal workpieces, in a production method for a conventional welded structural member (fitting-type welded structural member) is illustrated in FIG. 10. FIG. 10 is depicted correspondingly to FIG. 5, wherein any jig element having the same or similar function therebetween is assigned with the same reference sign. As illustrated in FIG. 10, in addition to the jig elements used in the step S3 in this embodiment, a clamp 133 is used in the conventional process to press a distal edge of each of two standing walls of a lower metal workpiece 201 from thereabove. Further, a stepped pin 132 is used as a positioning pin. Thus, the lower metal workpiece 201 is positioned between a supporting base 31 and the clamp 133, in an up-down direction, and an upper metal workpiece 202 is positioned between a stepped portion 132a of the stepped pin and a clamp 33, in the up-down direction. As above, because the two metal workpieces 201, 202 for use in producing the fitting-type welded structural member do not have any butted region therebetween, it becomes necessary to add a jig element for positioning in the up-down direction, and change the positioning pin from a pin having no stepped portion to a stepped pin.

In this embodiment, as compared to the above production method for the fitting-type welded structural member, the jig element for positioning in the up-down direction can be omitted, so that it becomes possible to simplify a jig assembly and reduce production cost. Moreover, in the case of using the stepped pin 132, it is necessary to change the jig element depending on a shape (height dimension) of an intended structural member. In this regard, the use of the pin 32 having no stepped portion makes it possible to eliminate such a need, i.e., to provide enhanced flexibility of production.

Figure 6:
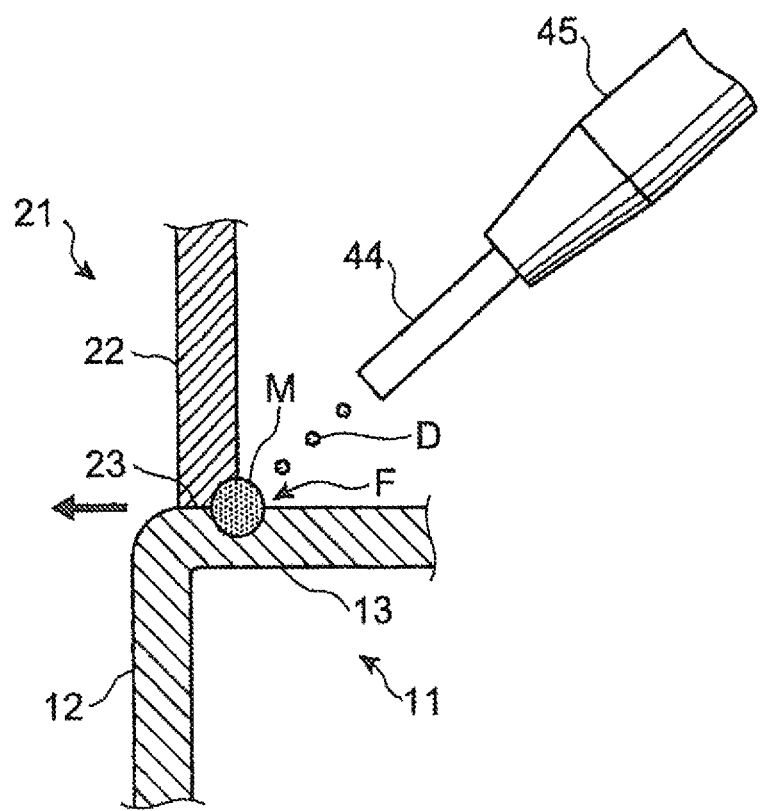
FIG. 6 is a schematic diagram illustrating a step of welding the positioned metal workpieces together.

FIG. 6 is a schematic diagram illustrating the joining step S4 of welding the positioned metal workpieces 11, 21 together. In the joining step S4, the welding is performed using a MAG welder as one example of an arc welder. In FIG. 6, the reference signs 44 and 45 denote, respectively, a welding wire and a copper tube of a welding torch, and the reference signs D and M denote, respectively, a droplet and a fusion zone. The copper tube 45 covers an outer periphery of the welding wire 44 while allowing a lower portion of the welding wire 44 to be exposed. A ceramic insulation layer (not illustrated) is provided around an outer periphery of the copper tube 45, and a mixed gas (shielding gas) of inert gas and carbon dioxide gas is supplied from a gap between the insulation layer and the copper tube 45. Then, an L-shaped butted region F where each of the two pairs of the flanges 13 of the first metal workpiece 11 and the distal edges 23 of the standing walls 22 of the second metal workpiece 21 are butted against each other is externally subjected to welding. The welding is continuously performed along the butted region F in an axial direction thereof (a direction perpendicular to the drawing sheet of FIG. 6).

In this process, the welding is performed while the flange 13 is fused to the fusion zone M according to arc energy supplied to the butted region F. In the case where the supply amount of welding energy is relatively large, the flange 13 is entirely fused to the fusion zone M to form the welded portion 6 as illustrated in FIGS. 1B and 2B. In the case where the supply amount of welding energy is relatively small, the flange 13 is partly fused to the fusion zone M, and a portion of the flange 13 remaining without fusion is formed as the protruding section 4 as illustrated in FIGS. 1A and 2A. The supply amount of welting energy can be controlled based on an electricity to be applied to the MAG welder, a welding time or the like.

Figure 11:
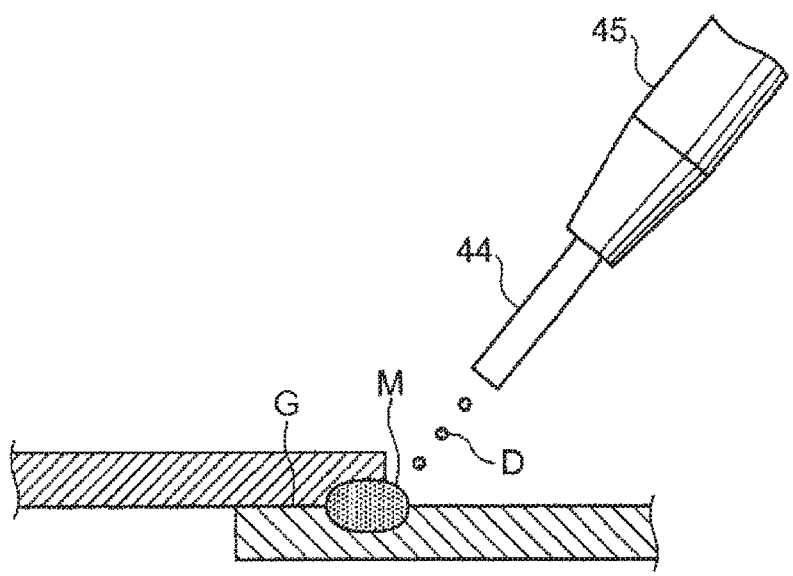
FIG. 11 is a schematic diagram illustrating a step of welding two metal workpieces together, in a production method for the conventional welded structural member.

For comparison, a step of welding two metal workpieces, in a production method for a conventional welded structural member (flange mating-type or fitting-type welded structural member), is illustrated in FIG. 11. During welding such as arc welding, zinc in the plated layer is vaporized along with the welding, causing generation of zinc gas. In this regard, because, in the production method for the conventional welded structural member, a distance of a contact region between the two metal workpieces, such as the mated surfaces of the flanges or the fitted surfaces, is relatively long, the generated zinc gas is less likely to be discharged from the fusion zone M toward a side opposite to a welding area (toward the closed cross-section), so that blowholes are more likely to occur in the metal workpieces.

On the other hand, in this embodiment, welding is performed along the L-shaped butted region F. In this case, because a distance of a contact region between the metal workpieces 11, 21 is only a plate thickness of the metal workpiece 21, such zinc gas is more likely to be discharged from the fusion zone M inwardly (toward the closed cross-section), so that it becomes possible to suppress the occurrence of blowholes in the metal workpieces 11, 21.

Particularly, in the case where welding is performed while the flange 13 is entirely fused to the fusion zone M, under a condition that the supply amount of arc energy is set to a relatively large value, the zinc gas is discharged from the fusion zone M directly to the closed cross-section, so that it becomes possible to more effectively suppress the occurrence of blowholes in the metal workpieces 11, 21.

An example of application of the welded structural member 10 will be described below.

Figure 7:
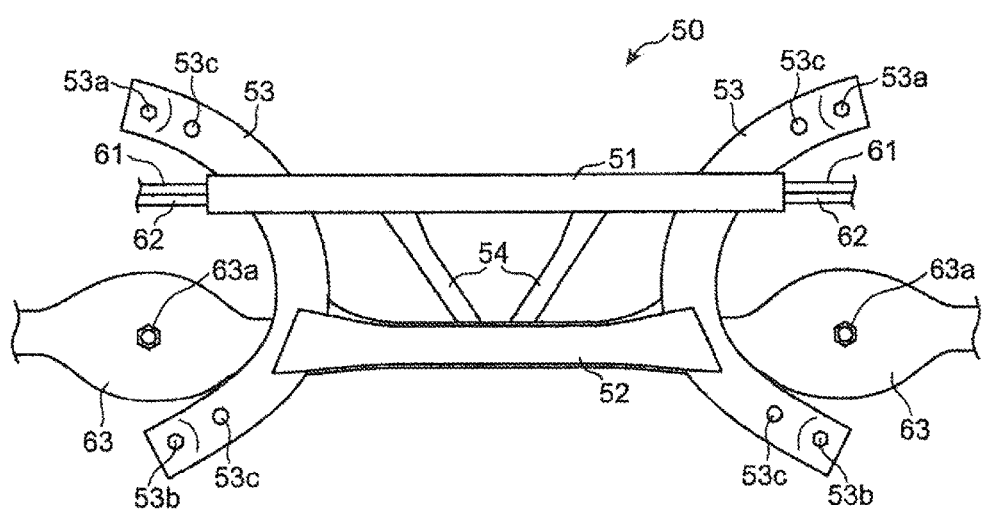
FIG. 7 is a top plan view schematically illustrating a subframe of an automotive vehicle.

FIG. 7 is a top plan view schematically illustrating a subframe of an automotive vehicle. The subframe 50 is provided at a rear of a vehicle body of an FF (front-engine front-drive) vehicle to support a multi-link suspension having a plurality of suspension arms for setting a position of an axle shaft.

The subframe 50 comprises: a front cross member 51 and a rear cross member 52 provided with a distance therebetween in a vehicle front-rear direction and each extending in a vehicle width direction; a pair of side members 53 to which right and left ends of each of the cross members 51, 52 are connected and each of which extends in the vehicle front-rear direction; and a pair of coupling members 54 disposed between the side members 53 to couple the cross members 51, 52 together.

The multi-link suspension comprises a pair of upper suspension arms 61, a pair of lower suspension arms 62, and pair of rear lower arms 63, on right and left sides of the subframe 50. Each of the suspension arms 61, 62 is supported by the front cross member 51 swingably in an up-down direction, and each of the rear lower arms 63 is supported by the rear cross member 52 swingably in an up-down direction. Each of the rear lower arms 63 has a spring seat 63a, and a spring having one end attached to the vehicle body is attached to the spring seat 63a through the other end thereof.

Two mount sections 53a, 53b are provided, respectively, at front and rear ends of each of the side members 53, and the subframe 50 is attached to the vehicle body through the mount sections 53a, 53b.

Figure 8:
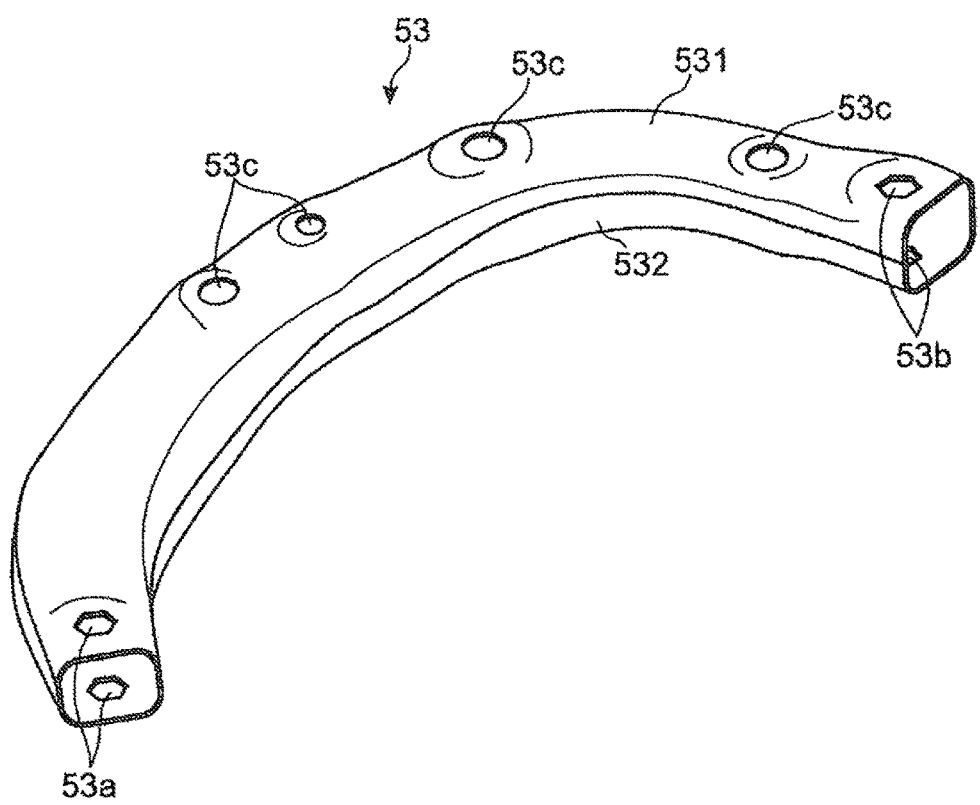
FIG. 8 is a perspective view illustrating a side member which is a part of the subframe of the vehicle.
Figure 9A:
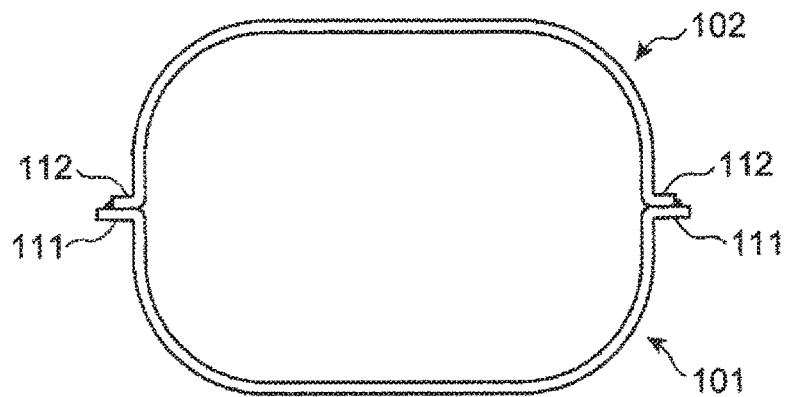
FIG. 9A is a front view illustrating one type of conventional welded structural member (flange mating-type welded structural member)
Figure 9B:
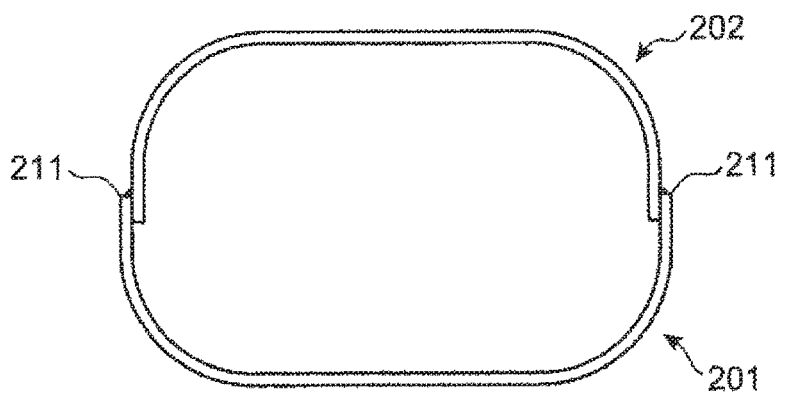
FIG. 9B is a front view illustrating another type of conventional welded structural member (fitting-type welded structural member).

FIG. 8 is a perspective view of the side member 53. The side member 53 is a closed cross-sectional member extending in the vehicle front-rear direction while curving in an approximately arc pattern. Thus, the welded structural member 10 can be applied to this side member 53. That is, the side member 53 is produced by welding two metal members 531, 532, wherein the metal members 531, 532 correspond, respectively, to the first portion 1 and the second portion 2 of the welded structural member 10. A pair of through-holes 53c formed in the side member 53 are regions for allowing the positioning pin 32 to be penetratingly inserted therein, i.e., corresponds to the through-holes 7 of the welded structural member 10.

Although the present invention has been described based on the above embodiment, it should be noted that the present invention is not limited to the embodiment. It should also be noted that various changes and modifications may be made in the embodiment, and therefore there are many modifications of the embodiment. Some modified embodiments will be described below.

For example, although the above embodiment has been described based on an example where the welded structural member 10 is applied to a side member 53 of a subframe for supporting a plurality of suspension arms of an automotive vehicle, the present invention may be applied to any other suitable welded structural member having a closed cross-section, such a front side frame or a rear side frame in the field of automobile vehicles, and reservoir tanks and building materials in the fields other than the field of automobile vehicles.

Although the above embodiment has been described based on an example where the welded structural member 10 is a closed cross-sectional member, the welded structural member is not necessarily configured to have a close cross-section over an overall length thereof, but may be configured to have a close cross-section in a part of the overall length.

Although the above embodiment has been described based on an example where the first metal workpiece and the second metal workpiece are pressed by utilizing a drawing process, any other suitable shaping process, such as a press forming process, may be used.

Although the above embodiment has been described based on an example where welding is performed in a state in which the second metal workpiece 21 is mated to the first metal workpiece 11 in a vertical direction, the welding may be performed in a state in which the first metal workpiece 11 and the second metal workpiece 21 are mated together in a horizontal direction.

Although the above embodiment has been described based on an example where a workpiece (steel plate stock) consisting mainly of iron is used as that for the metal workpieces 11, 21, a workpiece consisting mainly of any other suitable metal material may be used. The present invention may also be applied to not only a welded structural member obtainable by welding two metal workpieces made, respectively, of similar metal materials but also a welded structural member obtainable by welding two metal workpieces made, respectively, of dissimilar metal materials.

Although the above embodiment has been described based on an example where the welded structural member is produced by arc welding, the welded structural member is produced by any other suitable welding process such as laser welding.

In the above embodiment, the second metal workpiece 21 is formed in a cross-sectionally U shape having the base wall 24 and the pair of standing walls 22. As used herein, the term "cross-sectionally U shape" is not limited to the shape of the second metal workpiece 21 illustrated in the figures. For example, the second metal workpiece 21 may have a cross-sectional angular shape in which the base wall 24 and each of the standing walls 22 intersect at an approximately right angle, or may have an cross-sectional substantially semi-circular or semi-elliptical shape in which the base wall 24 and each of the standing walls 22 are generally formed continuously in a smooth curve.

In the above embodiment, the first metal workpiece 11 is formed in a cross-sectionally hat shape having the base wall 14, the pair of standing walls 12, and the pair of flanges 13. As used herein, the term "cross-sectionally hat shape" is not limited to the shape of the first metal workpiece 11 illustrated in the figures. For example, a cross-sectionally U-shaped part (the base wall 14 and the standing walls 12) of the first metal workpiece 11 other than the flanges 13 may be formed in various other suitable shapes in the same manner as that described above.

Last of all, distinctive features disclosed in the above embodiment and functions/advantageous effects based on the features will be outlined below.

The above embodiment discloses a method of producing a welded structural member internally having a closed cross-section. This method comprises: a first preparation step of preparing a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls; a second preparation step of preparing a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges; a positioning step of positioning the first metal workpiece and the metal workpiece in such a manner that each of two pairs of the distal edges of the second standing walls and the inner edge regions of the flanges are butted against each other; and a joining step of externally welding a butted region of each of the pairs of the distal edges of the second standing walls and the inner edge regions of the flanges to thereby join the first metal workpiece and the second metal workpiece together to form the closed cross-section.

The above method makes it possible to suppress the occurrence of blowholes during welding to sufficiently ensure strength of the welded structural member. Specifically, in the case where at least one of the first metal workpiece and the second metal workpiece has a plated layer, metal gas generated by vaporization of plated metal during welding is likely to mix in a fusion zone. In this regard, in this method, an L-shaped butted region where each of the two pairs of the flanges of the first metal workpiece and the standing walls of the second metal workpiece are butted against each other is externally subjected to welding, so that metal gas is more likely to be discharged from the fusion zone inwardly (toward the closed cross-section). This makes it possible to suppress the occurrence of blowholes in the welded portion to sufficiently ensure strength of the welded portion.

In this method, it is not necessary to entirely fuse the flanges into the welded portion. That is, the joining step may include welding the butted region while fusing at least a part of the flange thereto.

Preferably, the first preparation step comprises a substep of pressing a flat plate-like metal workpiece into a cross-sectionally hat shape; and the second preparation step comprises a first substep of pressing a flat plate-like metal workpiece into a cross-sectionally hat shape, and a second substep of bending back a flange of a cross-sectionally hat-shaped plate formed by the first substep, to transform the hat-shaped plate into a cross-sectionally U shape.

According to this feature, the cross-sectionally hat-shaped first metal workpiece can be prepared by a smaller number of steps than the cross-sectionally U-shaped second metal workpiece, so that it becomes possible to reduce production cost, as compared to the case of producing a fitting-type welded structural member using two cross-sectionally U-shaped metal workpieces.

Preferably, the positioning step includes superposing the first metal workpiece and the metal workpiece one-above-the-other, and pressing an upper one of the superposed metal workpieces from thereabove.

In the case where the first metal workpiece and the metal workpiece are superposed one-above-the-other, and pressed from thereabove, the lower metal workpiece functions as a positioning member for the upper metal workpiece, so that it becomes possible to simplify a jig assembly to thereby reduce the production cost.

At least one of the first metal workpiece and the metal workpiece may have a plated layer.

In the case where at least one of the first metal workpiece and the metal workpiece has a plated layer, metal gas causing blowholes during welding is more likely to occur. However, the use of this method makes it possible to suppress the occurrence of such blowholes.

The above embodiment also discloses a welded structural member internally having a closed cross-section. This welded structural member comprises: a first portion and a second portion opposed to each other while interposing the closed cross-section therebetween; and a welded portion joining the first portion and the second portion together. The first portion is, in a pre-welding state, composed of a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls, and the second portion is, in a pre-welding state, composed of a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges. Further, the welded portion is formed by externally welding a butted region in which each of two pairs of the distal edges of the second standing walls and the inner edge regions of the flanges are butted against each other.

This feature makes it possible to realize a high-strength welded structural member reduced in risk of the occurrence of blowholes.

INDUSTRIAL APPLICABILITY

As above, the present invention makes it possible to suppress the occurrence of blowholes during welding to sufficiently ensure strength of a welded structural member. Thus, the present invention has a potential of being suitably used in the manufacturing industrial field of automotive vehicles comprising this type of welded structural member, or the like.

This application is based on Japanese Patent applications No. 2014-265677 filed in Japan Patent Office on Dec. 26, 2014 and No. 2014-265683 filed in Japan Patent Office on Dec. 26, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A method of producing a welded structural member internally having a closed cross-section, comprising:
a first preparation step of preparing a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls;
a second preparation step of preparing a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges;
a positioning step of positioning the first metal workpiece and the second metal workpiece in such a manner that each of two pairs of the distal edges of the second standing walls and the inner edge regions of the flanges are butted against each other; and
a joining step of externally welding a butted region of each of the pairs of the distal edges of the second standing walls and the inner edge regions of the flanges to thereby join the first metal workpiece and the second metal workpiece together to form the closed cross-section,
wherein the joining step includes welding the butted region while fusing substantially all of the flange in such a manner that a welded portion bulging into the closed cross-section is formed in the butted region.

2. The method as recited in claim 1, wherein at least one of the first metal workpiece and the second metal workpiece has a plated layer.

3. The method as recited in claim 1, wherein the positioning step includes superposing the first metal workpiece and the second metal workpiece one-above-the-other, and pressing an upper one of the superposed metal workpieces from thereabove.

4. The method as recited in claim 3, wherein at least one of the first metal workpiece and the second metal workpiece has a plated layer.

5. The method as recited in claim 1, wherein:
the first preparation step comprises a substep of pressing a flat plate-like metal workpiece into a cross-sectionally hat shape; and
the second preparation step comprises a first substep of pressing a flat plate-like metal workpiece into a cross-sectionally hat shape; and a second substep of bending back a flange of a cross-sectionally hat-shaped plate formed by the first substep, to transform the hat-shaped plate into a cross-sectionally U shape.

6. The method as recited in claim 5, wherein the positioning step includes superposing the first metal workpiece and the second metal workpiece one-above-the-other, and pressing an upper one of the superposed metal workpieces from thereabove.

7. The method as recited in claim 6, wherein at least one of the first metal workpiece and the second metal workpiece has a plated layer.

8. A method of producing a welded structural member internally having a closed cross-section, comprising:
a first preparation step of preparing a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls;

a second preparation step of preparing a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges;

a positioning step of positioning the first metal workpiece and the second metal workpiece in such a manner that each of two pairs of the distal edges of the second standing walls and the inner edge regions of the flanges are butted against each other; and a joining step of externally welding a butted region of each of the pairs of the distal edges of the second standing walls and the inner edge regions of the flanges to thereby join the first metal workpiece and the second metal workpiece together to form the closed cross-section, wherein, the first preparation step comprises a substep of pressing a flat plate-like metal workpiece into a cross-sectionally hat shape, the second preparation step comprises a first substep of pressing a flat plate-like metal workpiece into a cross-sectionally hat shape, and a second substep of bending back a flange of a cross-sectionally hat-shaped plate formed by the first substep, to transform the hat-shaped plate into a cross-sectionally U shape, and the joining step includes welding the butted region while fusing at least a part of the flange thereto.

9. The method as recited in claim 8, wherein the positioning step includes superposing the first metal workpiece and the second metal workpiece one-above-the-other, and pressing an upper one of the superposed metal workpieces from thereabove.

10. The method as recited in claim 9, wherein at least one of the first metal workpiece and the second metal workpiece has a plated layer.

11. A method of producing a welded structural member internally having a closed cross-section, comprising:

a first preparation step of preparing a cross-sectionally hat-shaped first metal workpiece which has a first base wall, a pair of first standing walls each standing from a respective one of widthwisely opposite edges of the first base wall, and a pair of flanges each bending outwardly from a respective one of distal edges of the first standing walls;

a second preparation step of preparing a cross-sectionally U-shaped second metal workpiece which has a second base wall, and a pair of second standing walls each standing from a respective one of widthwisely opposite edges of the second base wall so as to have a distal edge contactable with a corresponding one of inner edge regions of the pair of flanges;

a positioning step of positioning the first metal workpiece and the second metal workpiece in such a manner that each of two pairs of the distal edges of the second standing walls and the inner edge regions of the flanges are butted against each other; and a joining step of externally welding a butted region of each of the pairs of the distal edges of the second standing walls and the inner edge regions of the flanges to thereby join the first metal workpiece and the second metal workpiece together to form the closed cross-section, wherein the first preparation step comprises a substep of pressing a flat plate-like metal workpiece into a cross-sectionally hat shape, and the second preparation step comprises a first substep of pressing a flat plate-like metal workpiece into a cross-sectionally hat shape, and a second substep of bending back a flange of a cross-sectionally hat-shaped plate formed by the first substep, to transform the hat-shaped plate into a cross-sectionally U shape.

12. The method as recited in claim 11, wherein the positioning step includes superposing the first metal workpiece and the second metal workpiece one-above-the-other, and pressing an upper one of the superposed metal workpieces from thereabove.

13. The method as recited in claim 12, wherein at least one of the first metal workpiece and the second metal workpiece has a plated layer.

* * * * *